United States Patent [19]

D'Angelo et al.

[11] 4,303,915

[45] Dec. 1, 1981

[54] SILENT COMMUNICATOR

[76] Inventors: George D'Angelo, 2649 Tronero Way, Rancho Cordova, Calif. 95670; Michael Cannon, 1440 29th Ave., Oakland, Calif. 94601

[21] Appl. No.: 56,706

[22] Filed: Jul. 11, 1979

Related U.S. Application Data

[63] Continuation of Ser. No. 825,920, Aug. 19, 1977, abandoned.

[51] Int. Cl.³ .............................................. G06F 3/14
[52] U.S. Cl. ..................................... 340/711; 340/756; 340/792
[58] Field of Search ................ 340/711, 756, 762, 792

[56] References Cited

U.S. PATENT DOCUMENTS

| | | | |
|---|---|---|---|
| 2,146,576 | 1/1939 | Haselton et al. | 340/711 |
| 3,641,390 | 2/1972 | Nakamura | 340/762 X |
| 3,845,473 | 10/1974 | Kawashima | 340/167 R |
| 3,925,779 | 12/1975 | Gerstenhaber | 340/711 |
| 3,932,859 | 1/1976 | Kyriakides et al. | 340/711 |
| 3,976,995 | 8/1976 | Sebestyen | 340/711 X |
| 4,070,664 | 1/1978 | Abe | 340/711 |
| 4,075,621 | 2/1978 | Salmon | 340/706 |
| 4,095,046 | 6/1978 | Frutiger et al. | 340/711 X |

OTHER PUBLICATIONS

Newell, Beynon, Brumfitt and Hossain, "An Alphanumeric Display as a Communication Aid for the Dumb," Medical and Biological Engineering, Jan. 1975, pp. 84–88.

Hamburger, "Electroluminescent Typewriter," N.E.C. vol. 15, pp. 575–584, 1959.

Primary Examiner—David L. Trafton
Attorney, Agent, or Firm—Mark C. Jacobs

[57] ABSTRACT

A portable hand held, electronic alphanumeric display device for assisting individuals to communicate with one another comprising a keyboard with function switches; a display section and assorted logic and power circuitry to sequentially display a worded message.

9 Claims, 7 Drawing Figures

BLOCK DIAGRAM

| | | | | | | | | | |
|---|---|---|---|---|---|---|---|---|---|
| A | | 1 | 2 | – | – | 5 | 6 | 7 | 8 | – |
| B | | – | – | 3 | 4 | 5 | 6 | 7 | 8 | 9 |
| C | | 1 | 2 | – | – | – | – | 7 | – | 9 |
| D | | – | – | 3 | 4 | 5 | 6 | 7 | – | 9 |
| E | | 1 | 2 | – | – | – | – | 7 | 8 | 9 |
| F | | 1 | 2 | – | – | – | – | 7 | 8 | – |
| G | | 1 | 2 | – | – | – | 6 | 7 | – | 9 |
| H | | 1 | 2 | – | – | 5 | 6 | – | 8 | – |
| I,1 | | – | – | 3 | 4 | – | – | – | – | – |
| J | | – | – | – | – | 5 | 6 | – | – | 9 |
| K | | 1 | 2 | – | 4 | 5 | – | – | 8 | – |
| L | | 1 | 2 | – | – | – | – | – | – | 9 |
| M | | 1 | 2 | 3 | 4 | 5 | 6 | 7 | – | – |
| N | | 1 | 2 | – | – | 5 | 6 | 7 | – | – |
| O,0 | | 1 | 2 | – | – | 5 | 6 | 7 | – | 9 |
| P | | 1 | 2 | – | – | 5 | – | 7 | 8 | – |
| Q | | 1 | 2 | – | 4 | 5 | 6 | 7 | – | 9 |
| R | | 1 | 2 | – | 4 | 5 | – | 7 | 8 | – |
| S,5 | | 1 | – | – | – | – | 6 | 7 | 8 | 9 |
| T | | – | – | 3 | 4 | – | – | 7 | – | – |
| U,V | | 1 | 2 | – | – | 5 | 6 | – | – | 9 |
| W | | 1 | 2 | – | 4 | 5 | 6 | – | – | 9 |
| X | | 1 | – | 3 | 4 | – | 6 | – | 8 | – |
| Y | | 1 | – | – | 4 | 5 | – | – | 8 | – |
| Z,2 | | – | 2 | – | – | 5 | – | 7 | 8 | 9 |
| 3 | | – | – | – | – | 5 | 6 | 7 | 8 | 9 |
| 4 | | 1 | – | – | – | 5 | 6 | – | 8 | – |
| 6 | | 1 | 2 | – | – | – | 6 | 7 | 8 | 9 |
| 7 | | – | – | – | – | 5 | 6 | 7 | – | – |
| 8 | | 1 | 2 | – | – | 5 | 6 | 7 | 8 | 9 |
| 9 | | 1 | – | – | – | 5 | 6 | 7 | 8 | 9 |

SILENT COMMUNICATOR

This is a continuation, of application Ser. No. 825,920, filed Aug. 19, 1977, now abandoned.

BACKGROUND OF THE INVENTION

In the world today there are millions of people who are unable to communicate with others due to speech and hearing defects. Those with speech defects may be severely impaired so as to be unable to utter an intelligible sound or may be slightly impaired so as to be unable to orally communicate at a particular time during particular stress conditions. Individuals with hearing defects also experience similar problems in trying to communicate effectively with others. Although able to many cases to orally communicate a thought to another individual, the hearing-impaired individual must read lips or resort to sign language to receive and understand a communication.

Thus, a serious problem exists for these individuals to be able to effectively communicate with other impaired individuals, as well as those not so impaired.

Orally communicating thoughts and ideas become a problem for the non-impaired individual, as well, where a different language is spoken by the other individuals engaged in conversation. Quite often this problem is alleviated by the fact that both individuals are able to read a similar language but cannot speak that same language. When visiting a foreign country the language problem is prevalent in the most basic of communicative contacts; i.e.: hailing a taxi; ordering a meal; and the like.

In all of these communicative situations the need to communicate is one which can be considered a portable need. That is, the use of fixed devices in an office or home serves no useful function when the communication contact occurs on the street or in a restaurant or at a social gathering, etc. There is, therefore, a need for individuals to have a device that is portable and self-contained and which can be used to communicate with another in the simplest communicative contact. Such a device is the essence of the invention described herein.

GENERAL DESCRIPTION OF THE INVENTION

The present invention is an electronic word display device designed to be used as a communications aid for orally impaired persons or for persons unable to communicate in the language being spoken by another individual. It is similar in appearance to a hand-held portable calculator which are quite popular today in enabling one to perform various mathematical calculations. Also, the present invention is similar in function to a portable typewriter which allows two people to communicate by one typing words and phrases for the other to read.

Thus, the present invention is an electronic word display device comprising a keyboard, a display and the necessary electronic circuitry to enable one to punch in various words and phrases on a keyboard which subsequently appear in readable form on an electronic display. The keyboard consists of numerous switches or buttons each being labeled or assigned one function. Thus, each letter of the alphabet would have one switch assigned to it for purposes of inputing that particular letter into the device. The same arrangement would exist for each of the 10 numeric characters, as well as functions such as "space" and "clear". It can, therefore, be appreciated that this device can be adapted to be used for many foreign languages so long as each keyboard switch is assigned a separate function or character from a foreign alphabet of characters.

In a preferred embodiment described herein the electronic device is shown utilizing the 26 character English alphabet, as well as 10 numeric characters and "space" and "clear" functions. The keyboard, therefore, consists of 38 keys arranged in rows and columns so as to be convenient for a keyboard operator to sequentially depress numerous keys in a relatively short period of time.

The electronic display is a sixteen character, nine segment, light emitting diode (LED) display which when energized displays any combination of words, phrases, or numerics so as to enable one to communicate with another. It can be appreciated by those skilled in the art that the character capacity per display line can be varied according to the operational and physical requirements of the device. Accordingly, different embodiments of the present invention would include devices having as many display lines as is needed for a particular application. The display is physically positioned on the device to face away from the keyboard operator so that it faces the individual intended to receive the worded message. One person can enter characters while a second or more persons, located physically opposite the operator, can read the display character. The message on the display can be cleared from the display by depressing the "clear" keyboard switch. In addition, spaces between words can be displayed by depressing the keyboard switch labeled "space" so as to avoid the confusion of joining two words.

The characters are presented on the display in a single row. Each new character enters on the viewer's right hand side of the display screen and all characters previously existing on the display screen will advance one position to the left. In the present embodiment a single 16 character line 9 segment display is described in relation to its electronic circuitry. As stated above, it can be appreciated by those skilled in the art that such a display system can consist of numerous lines or rows if so desired.

The electronic circuitry needed to transform a depressed keyboard switch into visual data on the display is powered by conventional batteries contained within the unit which provide a voltage Vcc that is approximately 5 volts d.c. The power supply circuit is so configured as to be able to run from ordinary 117 V.A.C. line voltage or in the alternative, charge the batteries for continued portable use. Since the batteries can be recharged, N-Cad type batteries are preferred.

The electronic circuit comprises six main function areas which are interconnected in such a way as to provide a desired display output from a specific input at the keyboard. The six main electronic functional areas comprises a keyboard with encoding means; a memory; a clock; update logic; scan logic and a display. The functional characteristics of the keyboard and display areas have been explained above. The precise circuit configurations are described below.

In this device, the memory unit receives data input from the keyboard and stores this information until it is extracted and passed onto the display. The information stored in the memory relates to which segment of the 9 segment light emitting diode character display needs to be energized to form a particular character. The scan logic enables a particular character display location from the 16 locations per line to be energized. The segments of the LED device are the anode of the diode while the particular character location is the cathode. Thus light is emitted by a particular energized segment at a particular character location only when that particular character location is also energized.

To activate the light emitting diodes (LED) the technology of multiplexing has been used. Although all characters in a multiplex display appear to be producing light at the same time, in fact this is merely an optical illusion caused by the limited capabilities of the human eye. In actuality, only one character position is being illuminated at any one time. In the present invention, the character on the viewer's right hand side is initially illuminated for approximately 350 microseconds. At the end of that time period the first character is turned off and the character immediately to its left is turned on for approximately the same period of time. This procedure is repeated until all 16 character display locations have been illuminated for approximately the same period of time. The process than repeats again at the right hand most character. Thus, a complete set of 16 characters is illuminated every 5.3 milliseconds, or approximately 188 times per second. This is sufficiently fast so that to the human eye all characters appear to be illuminated at the same time. The advantage of multiplexing is the reduction of logic and interconnection complexity that would otherwise be needed if all the character display locations were to be energized at the same time.

In order to sequentially input a proper character into a proper character location, a clock is referenced into update logic, scan logic and a random access memory. The clock being typically a square wave oscillator utilizing an RC time constant and integral feedback. The update logic controls the movement of the characters from one display position to another until all 16 characters are displayed. The update logic is responsible for controlling both the scan logic for character position location and the random access memory for type of characters in that character position. A more detailed description of the device and its assorted logic operations are described below.

BRIEF DESCRIPTION OF THE DRAWINGS

FIG. 7 is a schematic diagram showing the expansion of the scan logic of this invention to 32 characters from 16.

DETAILED DESCRIPTION OF THE DRAWINGS

Figure 1:
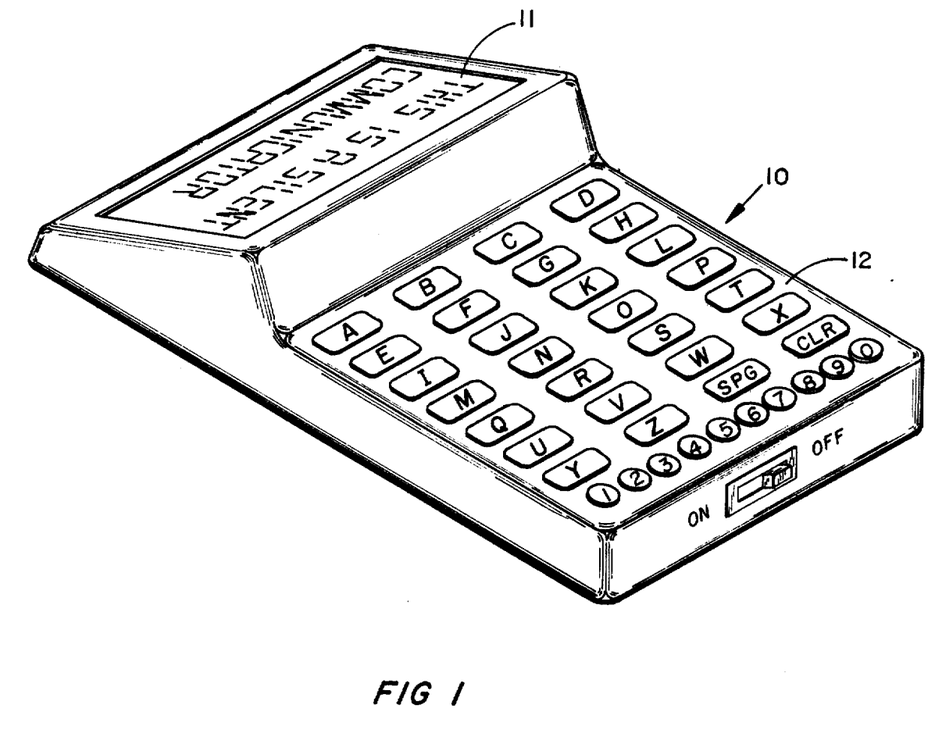
FIG. 1 is a perspective view of one embodiment of the present invention for English language application.

In FIG. 1 is shown in perspective view an electronic word display device 10 being the essence of the present invention. Display section 11 can be seen to be facing away from the operator, as previously explained, while keyboard 12 is shown containing keyboard switches A through Z, SPC, CLR and numeric characters 1 through and including 10. As can be appreciated from FIG. 1, this speech communication device affords an individual a rather inexpensive, highly mobile and comfortably sized piece of electronic apparatus by which to enhance one's communicative skills.

Figure 2:
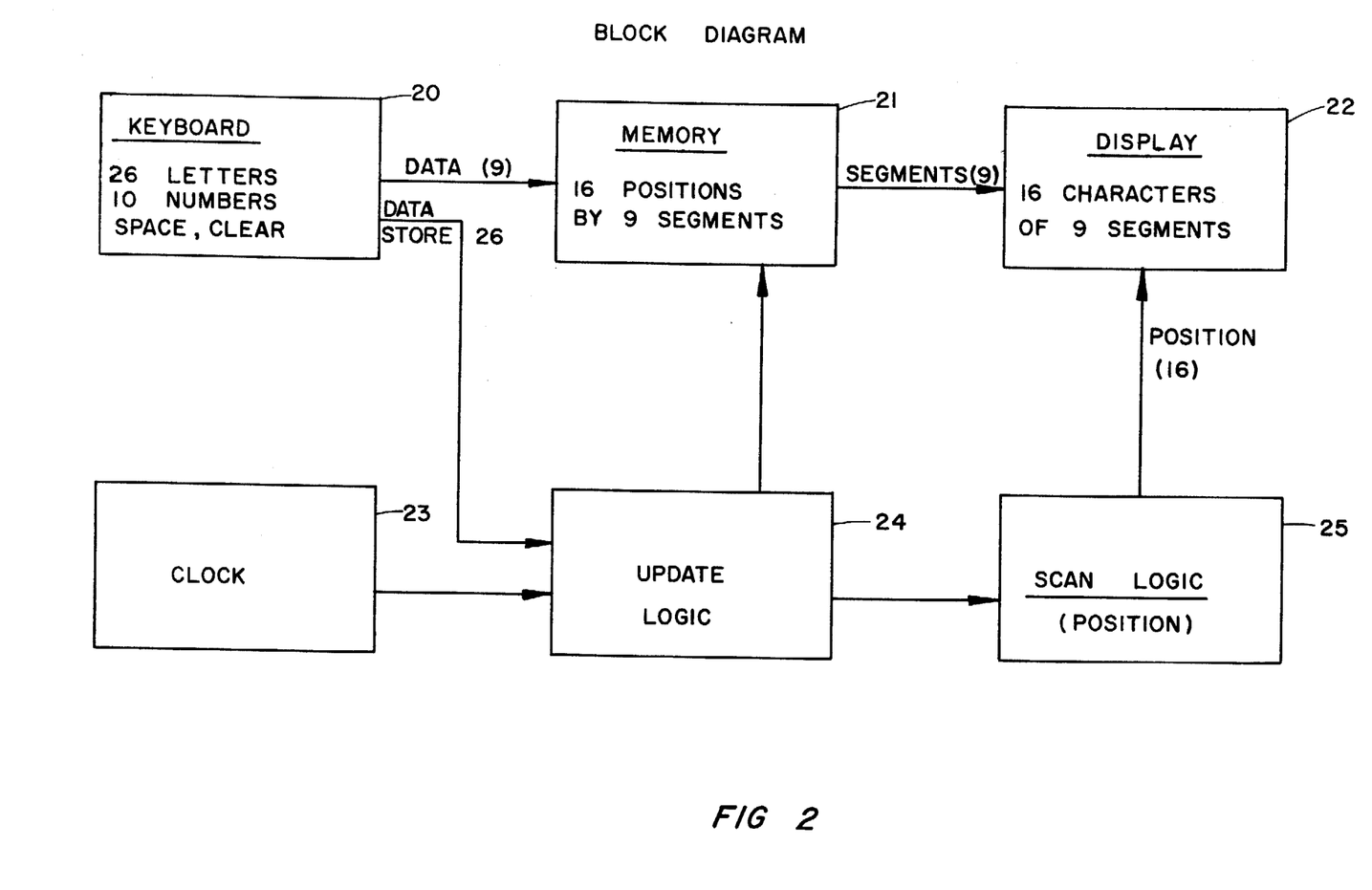
FIG. 2 is a block diagram showing the main functional elements of the present invention.

In FIG. 2 a block diagram schematically describing the main elements of the device is shown. As previously explained, the keyboard 20 provides data to the memory 21 in the form of segment or anode information for a particular type of character. A Data strobe signal 26 from the keyboard to the update logic 29 notifies the update logic 24 of the actuation of a switch on the keyboard. Again, as previously indicated, the update logic 24 feeds both the memory 21 and scan logic 28 to control the sequential operation of the characters displayed on the display device 22. A clock 23 is primarily inputed into the update logic 24.

Figure 3:
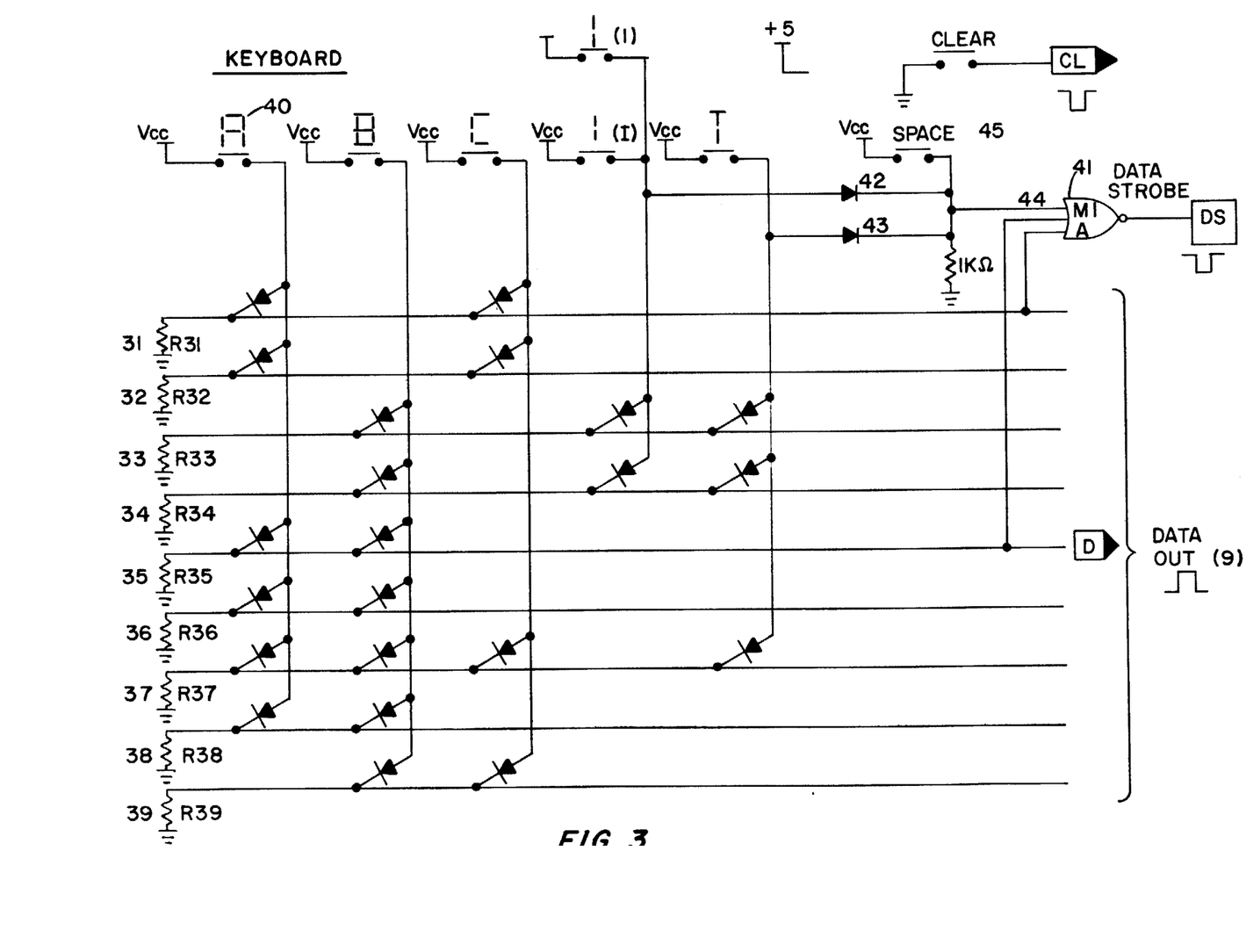
FIG. 3 is a schematic circuit diagram of a portion of the keyboard encoding scheme.
Figure 3A:
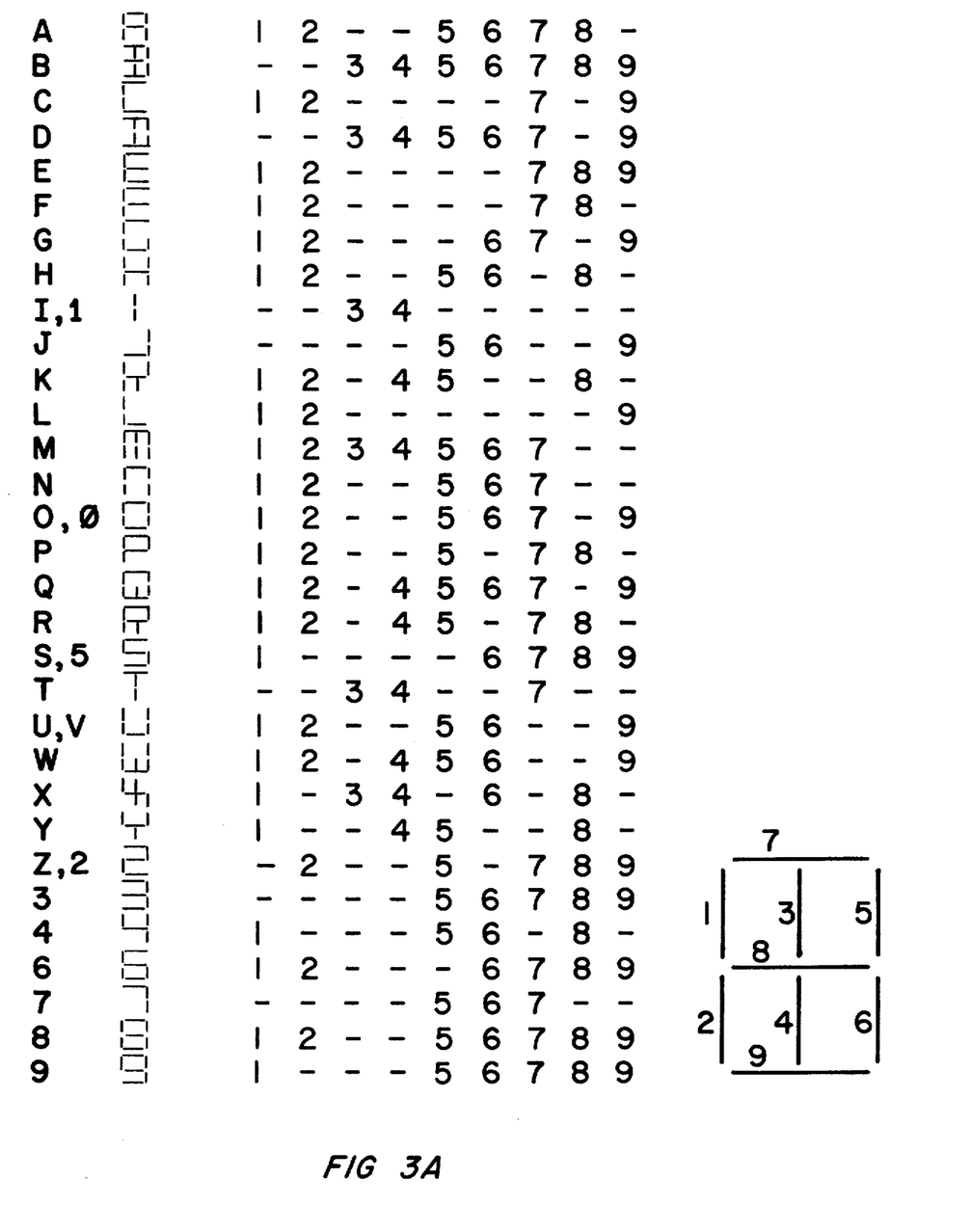
FIG. 3A, including A-Z, is a diagrammatic view of a 9 segment display device and a character encoding chart for such a 9 segment device.

FIG. 3 shows a representative portion of the encoding circuitry used to provide data input to the memory. FIG. 3A shows the encoding scheme used for the LED 9 segment device. Thus, for each character a plurality of segments are needed to be energized. The encoding scheme shown in FIG. 3A describes which of the 9 segments, numbered 1 through 9, must be energized for each particular character. Because of the non-technical usage of the device, certain ambiguities are allowed in the characters encoding scheme. The character "I" and "1" are the same, as well as "S" and "5"; "U" and "V"; and "Z" and "2". These ambiguities provide for greater simplification of the keyboard and thus enhances the overall portable nature of the device.

As shown in FIG. 3, a diode matrix is used to encode the input from the keyboard switch. The nine data lines 31 through 39 represent each of the nine segments of the display device. Each data line 31 through 39 begins with a pull down resistor R31 through R39 connected to electrical ground and terminates on FIG. 4 at the input M1 through M9 to a 16 character random access memory 21. When a particular keyboard switch is depressed, the data lines 31 through 39 representing those segments to be lit to form a character will be pulled up to a Vcc voltage through each diode. Typically, these diodes are a low cost silicon type such as 1N4148 and the like. Since the only characters in which neither segment 1, or segment 5 are lit are "I" and "T" (refer to encoding chart—FIG. 3A), data lines 1 and 5 are gated through chip 41 to produce a data strobe signal. The result is that whenever data line 1 or data line 5 go high (to Vcc) the output of chip 41 goes low, to electrical ground, and thus indicates to the update logic that a keyboard switch has been depressed. In the case of characters "I" and "T", two diodes 42 and 43 are used to activate a third input 44 of chip 41. The "space" keyboard switch 45 also activates the third input 44 of chip 41. The connection to third input 44 is made necessary because "space" is a blank character but nevertheless, the data strobe signal must be issued so that the update logic will advance all the characters on the display to the left. It can be appreciated by those skilled in the field that different encoding systems can be utilized which would reduce the number of diode components that presently exist in the above-described preferred embodiment.

Figure 4:
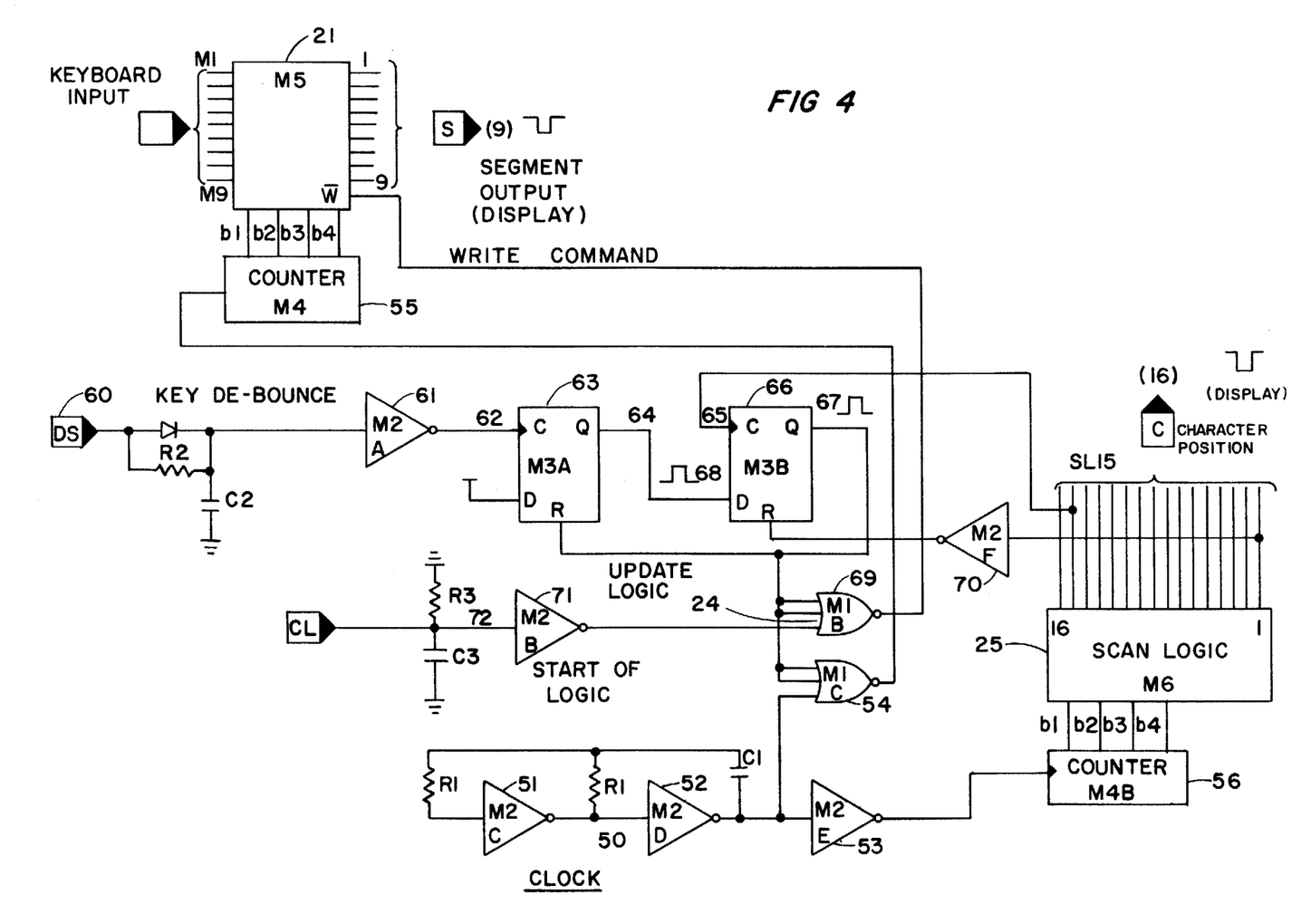
FIG. 4 is a schematic diagram of the memory, update logic, and scan logic portions of the device.

FIG. 4 shows the circuit relationship between the memory 21, update logic 24 and scan logic 25. In explaining the operation of this circuit, for the purpose of clarity, it should be assumed that a given set of characters are being displayed. This would be the normal or idling condition of the scan and memory circuitry. The circuit starts at the clock 50 wherein gates 51 and 52 form a square wave oscillator utilizing a $R_1 C_1$ time constant and integral feedback. The output of clock 50 is connected to gates 53 and 54. Gates 53 and 54 invert the signal so that the resultant signals reaching counters 55 and 56 are normally identical. Each counter 55 and 56 advance a 4 bit binary count through lines $b_1$ through $b_4$. Counter 55 controls the selection of 16 locations in the random access memory 21 while counter 56 controls the selection of 16 character positions on the display 22.

In operation, each counter 55 and 56 counts to 16, then returns to 1 and repeats this procedure approximately 188 times per second. Since counters 55 and 56 are synchronous with each other a given memory location will correspond with a given character position on each cycle. For example, if the character A is stored in memory, location 4 and the memory counter is at location 4 when the scan counter is at character position 7, then the character 4 will appear in position 7 approximately 188 times per second. The result is a static display in which the characters do not appear to be moving.

In the event that counters 55 and 56 are caused to be out of synchroncity by advancing the count on one counter while the other counter remains unchanged, all characters will appear to move across the display. This is accomplished in the following controlled manner. When a keyboard switch is depressed, the segments that need to be lit to represent that character are indicated by a high condition on lines M1 through M9 of memory 21. The data-strobe signal, as described above, is inputed to the update logic at point 60. The data-strobe signal is modified by a $R_2 C_2$ time constant and gate 61 in order to remove any contact bounce from the pressing or releasing of the key switch. The data strobe signal is thus connected to the clock input 62 of chip 63. Chip 63 is typically "D" type flip-flop which in this case is configured as a latch.

When the data-strobe signal is received on line 62, the output 64 of chip 63 is latched high. The clock 65 of chip 66 is attached to scan line number 15 labelled SL15. Thus, when character position 15 is being turned off and character position 16, (the left-most position on the display) is being turned on, the output 67 of chip 66 is high if a latched data strobe signal is present at input 68 of chip 66. When this occurs the following sequence of events occur: (1) chip 63 is reset; (2) chip 69 causes a write command to be issued to the memory 21; and (3) chip 14 inhibits the passage of clock transitions to the memory counter 55.

The issuance of a write command causes the memory location which was supplying character information to scan position 16 to change to the new character data presented from the keyboard 20. The inhibition of the clock pulses causes the new character to remain on the display segment data lines while the scan counter 56 proceeds to turn off position 16 and turn on position 1 Thus, the new character would appear displayed at position 1. If position 1 is turned on, gate 70 resets flip-flop 66 causing the memory counter 55 to resume its synchroncity with the scan counter 56. However, since the counters have been knocked out of synchroncity by one count, all characters on the display 22 shift one position to the left.

The clear and start-up function is controlled by gate 71. Clearing the display 22 is accomplished by actuating gate 69 and causing a write command to be issued for at least 5 milliseconds while no keyboard switches are being depressed. In effect, this causes the memory to fill with blank information. The $R_3 C_3$ network at the input 72 of gate 71 provides a ground potential when power is first applied to the system. The $R_3$ resistor will charge the $C_3$ capacitor to a high level over a period of approximately 10 milliseconds causing gate 71 to be active for at least twice the required time to clear the memory 21. The clear key on keyboard 20 when depressed causes the capacitor $C_3$ to be discharged, thereby duplicating the start-up condition and causes the display 22 to be cleared.

Figure 5:
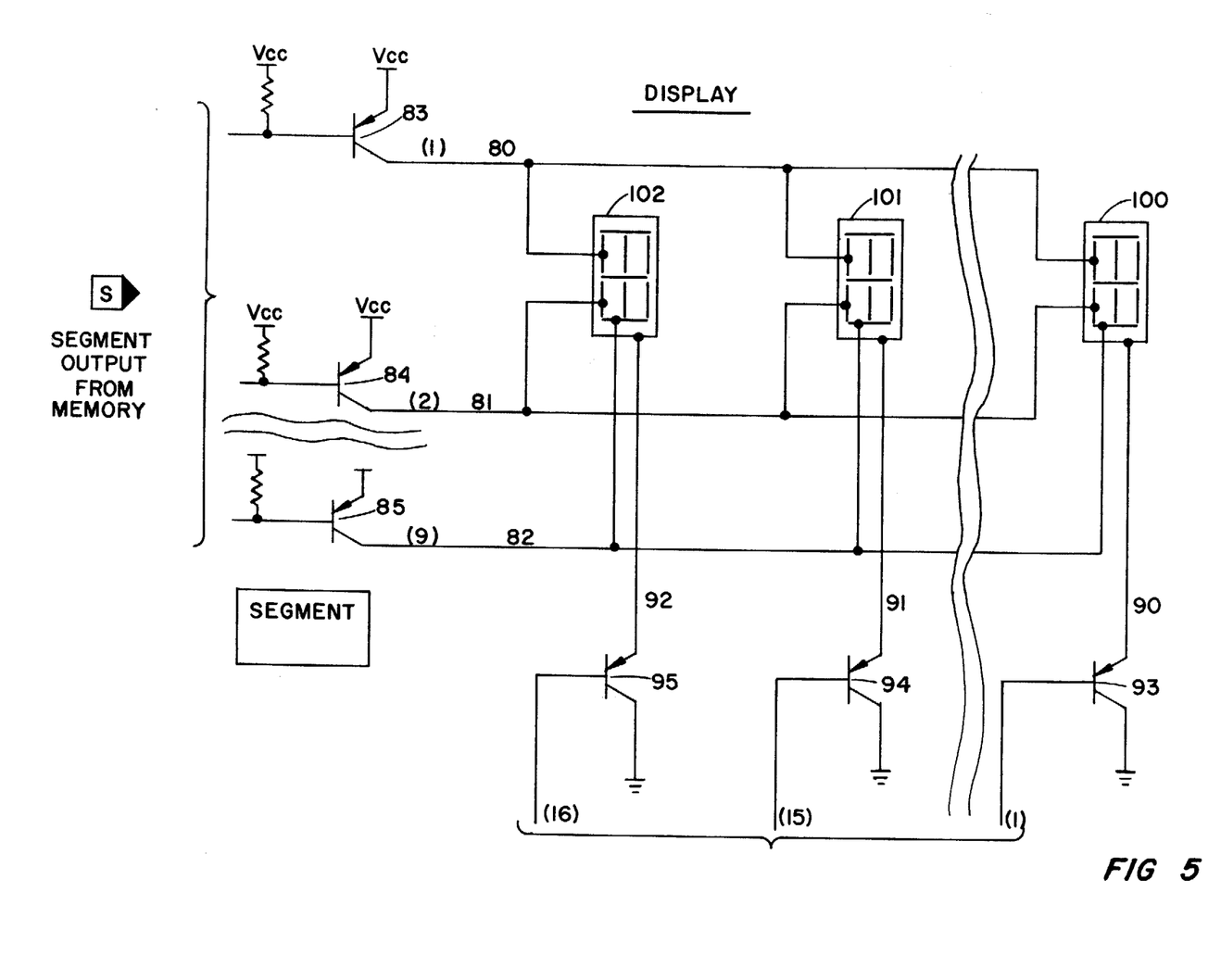
FIG. 5 is a partial schematic diagram showing three typical segments and position drivers and their electrical connections to the display device.
Figure 6:
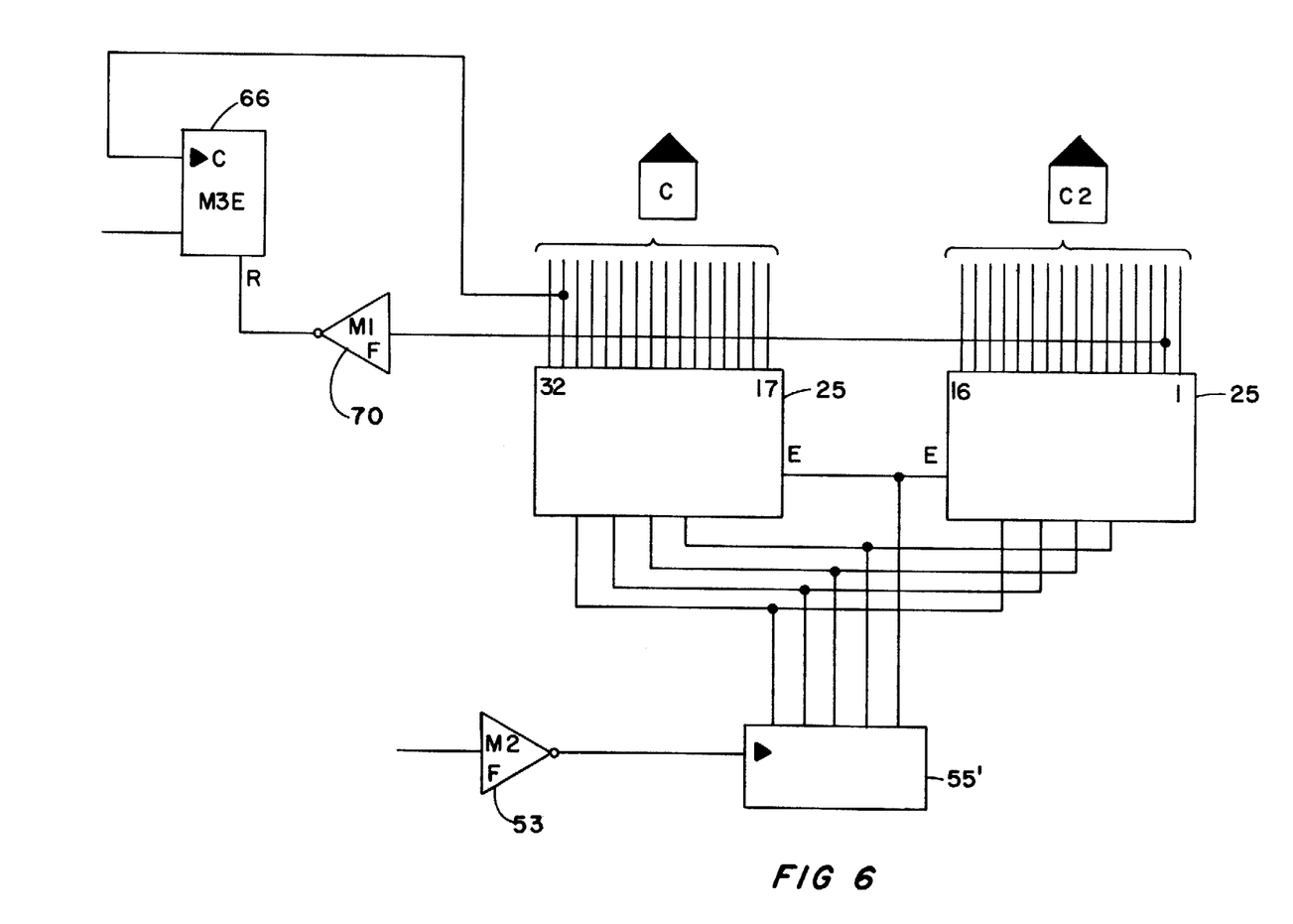
FIG. 6 is a schematic diagram showing the interconnection of the scan logic and counter and other components of this invention.

FIG. 5 shows the circuit relationships between three typical data lines 80, 81, 82, three typical position lines 90, 91, and 92 and display devices 100, 101 and 102. As can be appreciated, the remaining six data lines, 13 position lines and 13 display devices are interconnected in a similar manner.

The display devices 100, 101, and 102, as previously explained, are nine segment devices wherein each segment is an anode portion of the light emitting diode while the character position is the cathode size. Thus, when the anode is positively (+) energized in relation to the cathode, light will be emitted from that particular segment. Transistor switches 83, 84, and 85 are caused to conduct when a segment output is presented in the base lead of the transistor from the memory. Likewise, transistor switches 93, 94, and 95 are turned on when the scan logic exercises a particular character location. Thus, for example, if line 80 and 90 were turned on, display device 100 would appear lit for segment 1. (refer to FIG. 3A for segment notations). Data line 81 represents No. 2 segment information and is thus connected to the No. 2 segment at each character location. All nine segments would be connected to its appropriate segment at each display location.

Previously it has been disclosed how to provide a single line of readout material. It may be preferred, however, to provide a plurality of lines of words in order to improve communication between the sender and the receiver. Thus the basic 16 characters can be easily expanded to 32 or 64 characters and to even larger multiples of 16 characters with some slight modifications within the skill of the art.

No changes need be made to the memory section of the logic because the specified memory chip has the capability of storing up to 64 locations, each of which holds a code of 9 bits (one character). Counters 55 and 56 are only capable of counting to 16. These should be replaced by counters 55' and 56' capable of counting to 64, such as IC number 4024 (a 7 bit counter).

To expand the scan logic it is necessary to add additional decoders, i.e. scan logic devices, 25. A typical decoder would be IC part number 74154 readily available in the marketplace. New counters 55' and 56' may be used to directly drive up to form scan logic devices 25.

Naturally additional position drivers and display LED's must be added according to the total number of characters desired. Inverter 70 must be reconnected.

Reference is made to FIG. 7 for an example of the interconnections showing an expansion of the scan logic to 32 character output.

While LED's have been disclosed as the basis for the readout system, it is considered to be within the skill of the art to modify the circuitry as needed to employ liquid crystal or other readout indicia.

Since certain changes may be made in the above apparatus without departing from the scope of the invention herein involved, it is intended that all matter contained in the above description and shown in the accompanying drawings shall be interpreted as illustrative and not in a limiting sense.

We claim:

1. A portable hand-held electronic alphanumeric display device for communication of words and numbers comprising:

means to provide electrical energy to said device;

keyboard means to input a desired letter or numeral into said device;

means to encode said input letter or numeral to provide a data input into said device;

memory means to store said data input;

scan logic means to remove said data input from said memory means and present said data input sequentially as data output from said device;

means to display said data output;

a unitary logic means to both update the display with a new character and to cause the previously displayed characters to shift one position to the left;

a clock operatively connected to said scan logic, memory and unitary logic, wherein the means to update the display and shift characters leftwardly is logic means activated during the refreshing of a multiplexed display to permit replacement of a character in memory, which character is visualized in the leftmost position of the display, said means being responsive to the keyboard activation;

said means also desynchronizing the scan and memory timing when activated to thereby cause the character in the oldest memory position to be replaced, and to be displayed in the rightmost position of the display while shifting the visual position of each previously displayed character to the next leftwardly location in the display and;

enclosure means to substantially enclose said power supply means, encoding means and memory means and circumferentially enclose said input means and display means so that said input means and display means are functionally visible to a person operating said device.

2. A portable hand-held electronic alphanumeric display device according to claim 1 wherein said keyboard means to input a desired letter or numeral comprises a plurality of electrical button devices each assigned a single letter or number which when depressed causes electrical input of the desired letter or numeral into said device and when released returns to its normal electrically open position.

3. A portable hand-held electronic alphanumeric display device according to claim 1 wherein said means to encode said input letter or numeral comprises a particular array of diodes for each letter or numeral which has its anodes connected to said input means and its cathodes connected to a resistor, said resistor is connected at its other end to electrical ground.

4. A portable hand-held electronic alpha numeric display device according to claim 1 wherein said logic means to remove said data input from said memory means and present said data input sequentially as data output from said device buffer gating means connected to said clock; first counter means connected to said buffer gating means and said memory and said scan logic means so that data from said memory is outputed at appropriate sequential times at appropriate character locations upon excitation of said data strobe logic means.

5. The hand-held alpha numeric device of claim 4 wherein the scan logic means indexes the memory to cause the leftmost character being displayed to be replaced or remain the same in the display by coordinating the leftmost display character with the last memory character.

6. A portable hand-held electronic alphanumeric display device according to claim 1 wherein said display means comprises a plurality of nine segment light emitting diode devices.

7. A portable hand-held electronic alphanumeric display device according to claim 1 wherein said display means is positioned to be viewable from a direction approximately 180° from the position of an operator of said device.

8. A portable hand-held electronic alpha numeric display device as in claim 1 wherein the device is battery powered.

9. In an electrical circuit supportably enclosed in a hand-held portable device for multiplexing an electrical input signal into a visible letter or numeral comprising:

means to input an electrical signal into said device;

means to encode said electrical signal;

means to store said encoded electrical signal until such time that said encoded electrical signal is used in said device;

scan logic means to remove said encoded electrical signal from said storage means and update logic means to present said encoded electrical signals in updated time sequence to a display means as a new character and to cause the previously displayed character to visually shift one position to the left;

timing means operatively connected to all of said means to store, said scan logic and to said update logic;

means to display said encoded electrical signal into a visible letter or number corresponding to the same electrical signal entered by the means to input signals.

* * * * *